United States Patent
Eisenhauer et al.

(10) Patent No.: US 8,917,722 B2
(45) Date of Patent: *Dec. 23, 2014

(54) FIBRE CHANNEL FORWARDER FABRIC LOGIN SEQUENCE

(75) Inventors: Daniel G. Eisenhauer, Austin, TX (US); Roger G. Hathorn, Tucson, AZ (US); Henry J. May, Rochester, MN (US); Louis W. Ricci, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 658 days.

This patent is subject to a terminal disclaimer.

(21) Appl. No.: 13/152,102

(22) Filed: Jun. 2, 2011

(65) Prior Publication Data

US 2012/0308232 A1  Dec. 6, 2012

(51) Int. Cl.
*H04L 12/50* (2006.01)

(52) U.S. Cl.
USPC ........... 370/386; 370/395.2; 398/45; 398/58

(58) Field of Classification Search
USPC .............. 370/255, 257, 386, 395.2, 395.21, 370/395.3, 401; 709/237, 242; 398/45, 58
See application file for complete search history.

(56) References Cited

U.S. PATENT DOCUMENTS

| 6,260,092 | B1 | 7/2001 | Story et al. |
|---|---|---|---|
| 7,346,058 | B1 | 3/2008 | Natarajan et al. |
| 2004/0221047 | A1 | 11/2004 | Grover |
| 2006/0034302 | A1* | 2/2006 | Peterson ................ 370/401 |
| 2006/0262784 | A1 | 11/2006 | Cheethirala et al. |
| 2007/0067589 | A1 | 3/2007 | Mishra et al. |
| 2009/0041029 | A1 | 2/2009 | Dropps et al. |
| 2009/0254677 | A1* | 10/2009 | Desanti ................ 709/242 |
| 2010/0074137 | A1 | 3/2010 | Banerjee et al. |
| 2012/0106957 | A1* | 5/2012 | Willeke et al. ........... 398/58 |
| 2012/0275787 | A1* | 11/2012 | Xiong et al. ............ 398/45 |

FOREIGN PATENT DOCUMENTS

JP  11-355336  12/1999

OTHER PUBLICATIONS

Roger Hathorn, "Distributed FCF Fabric Login Sequence", Jun. 8, 2011, all.*
Claudio DeSanti, "Distributed FCF", T11/11-026v1, Mar. 2011, all.*
Claudio DeSanti, "Distributed FCF", T11/11-026v0, Feb. 2010, all.*

* cited by examiner

*Primary Examiner* — Jeffrey M Rutkowski
(74) *Attorney, Agent, or Firm* — Griffiths & Seaton PLLC

(57) ABSTRACT

System and computer program product embodiments for fiber channel forwarder fabric login sequence in a fiber channel switch environment, where a Fiber Channel Forwarder (cFCF) is separated from a Fiber Channel over Ethernet (FCoE) data forwarder (FDF), are provided. In one embodiment, by way of example only, at a Fiber Channel Login (FLOGI) to a target device from an initiator device, a node address acceptance notification is held from reaching the initiator device until each of the zoning distributions have been considered to have been completed.

13 Claims, 8 Drawing Sheets

FIBRE CHANNEL FORWARDER FABRIC LOGIN SEQUENCE

BACKGROUND OF THE INVENTION

1. Field of the Invention

The present invention relates in general to computers, and more particularly to a fibre channel forwarder fabric login sequence in a fibre channel switch environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Various components in computer systems, such as storage components, may be connected together using a fibre channel protocol, a gigabit speed data transfer technology used in a variety of settings including storage systems. When two fibre-channel ports are connected to each other via a fibre channel cable, a link initialization process must complete before the two ports can exchange meaningful data. Part of this link initialization process involves determining the speed at which the link will operate. In most cases, the fibre channel ports can support multiple speeds (e.g., 1 Gb/sec, 2 Gb/sec, 4 Gb/sec) and are normally configured to execute a standard speed negotiation algorithm in order to determine, and thereby operate at, the highest common speed supported by each port. This negotiation algorithm is part of the overall fibre channel standards set by the T11 Technical Committee of the Inter-National Committee for Information Technology Standards (INCITS) and the American National Standards Institute (ANSI).

SUMMARY OF THE DESCRIBED EMBODIMENTS

Fiber Channel over Ethernet (FCoE) is a technology used for transporting Fiber Channel (FC) frames over Ethernet which is standardized at the Technical Committee for Fiber Channel (T11) of the International Comp Committee for Information Technology Standards (INCITS). The transported FC frames used are based on an FC architecture for storage networking purposes. In conjunction with the technology used for transporting Fiber Channel (FC) frames over Ethernet, a distributed switch model and associated protocols of the current state of the art may be applied to both fibre channel over ethernet (FCoE) switches (FCFs) or just standard FC switches. During a fabric login (FLOGI) from a device, communication is required between all the components (e.g., FCoE data forwarder (FDF) and controlling Fibre Channel Forwarder (cFCF) of the distributed switch. The protocols of the current state of the art allow an end device (e.g., an initiating device) to begin communication with other devices (e.g., target device) in the fabric before the communication of required zoning information to other components of the distributed switch is complete. The current state of the art fails to synchronize all the FDF's in a distributed switch before allowing an end device to start communicating with another end device through all of the FDF's. As result, efficiency and productivity may be reduced.

Accordingly, and in view of the foregoing, various exemplary method, system, and computer program product embodiments for fibre channel forwarder fabric login sequence in a fibre channel switch environment, where a Fibre Channel Forwarder (cFCF) is separated from a Fibre Channel over Ethernet (FCoE) data forwarder (FDF), are provided. In one embodiment, by way of example only, at a Fibre Channel Login (FLOGI) to a target device from an initiator device, a node address acceptance notification is held from reaching the initiator device until each of the zoning distributions have been considered to have been completed.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
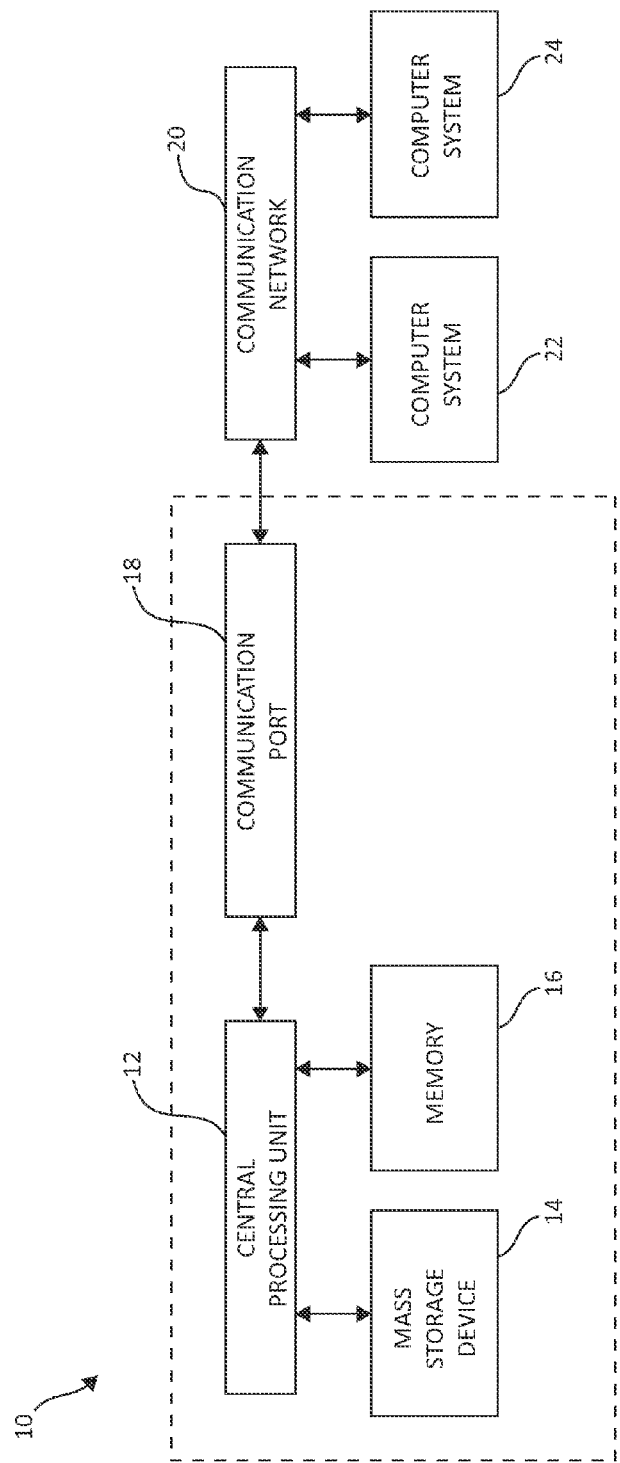
FIG. 1 illustrates a computer storage environment having an example storage device in which aspects of the present invention may be realized.

Computer systems in general and International Business Machines (IBM) compatible personal computer systems in particular have attained widespread use for providing computer power to many segments of today's modern society. Computer systems typically include a system processor and associated volatile and non-volatile memory, a display area, input means, and often interfaces, such as a network interface or modem, to other computing devices.

One of the distinguishing characteristics of these systems is the use of a system board to electrically connect these components together. These computing devices are information handling systems which are designed primarily to give independent computing power to a single user, or a group of users in the case of networked computing devices. Personal computing devices are often inexpensively priced for purchase by individuals or businesses. Nonvolatile storage devices such as hard disks, CD-ROM drives and magneto-optical drives are considered to be peripheral devices. Computing devices are often linked to one another using a network, such as a local area network (LAN), wide area network (WAN), or other type of network. As described previously, computer systems can also be interconnected using a fibre channel network. By linking to other computer systems, a computing device can use resources owned by another computing device. These resources can include files stored on nonvolatile storage devices and resources such as printers and storage area networks (SANs). Fibre channel can be used to connect these devices and resources, including connecting computer systems to storage devices such as SAN devices.

Fibre channel is a high speed medium used for data transfer and storage. It is essentially a serial data channel preferably created over fiber optic cabling. Fibre channel provides a logical bi-directional, point-to-point connection between a host and a device. Similar to networking technologies using local area network (LAN) or wide area network (WAN) configurations, fibre channel also is used to connect PCs, servers, printers, and storage devices. Because fibre channel allows the use of fiber optic cabling, connections along a fibre channel network makes it possible to transfer data at greater distances. In addition, fibre channel makes high-speed data transfers possible. Fibre channel also provides increased bandwidth over communication channels.

Channels and networks are the two primary ways that data is transferred between devices. Such devices include processors and peripherals such as printers and storage devices. Channels transfer data through switched or direct point to point connections. Channels work by creating a fixed connection between the source and destination devices until the transfer is complete. Channels transfer data at high speeds and are economical. Networks (i.e., LAN or WAN), on the other hand are collections of nodes such as processors, print devices, and workstations. Connections on networks are typically slower than those made via channels. Also, because networks are software intensive, they are much more expensive due to upgrade and compatibility issues. Channels work best among few devices and connect via predefined addresses. Networks, on the other hand, can handle multiple requests among multiple connections.

Fibre Channel is hybrid of both network and channel methods. Consequently, Fibre channel is often considered an I/O (input/output) interface that combines the best of networks and channels. In addition, fibre channel systems can be configured in different ways depending on needs of the user, thus providing flexibility in an ever changing systems environment.

Devices are connected on Fibre Channel systems using various interconnection topologies. Interconnection devices available for use on Fibre Channel are switches, hubs, and bridges. The ability of fibre channel to use different interconnect devices makes it scalable depending on user needs. For small fibre channel networks, hubs and bridges may be used for connecting devices in a topology called Fiber Channel Arbitrated Loop (FC-AL). As fibre channel networks get larger and network demands increase, switching may be implemented. A switched fibre channel network is called a "fabric." A fabric is simply the underlying switching architecture used by a fibre channel switch. A fabric may contain many loops interconnected with switches.

As previously mentioned, Fiber Channel over Ethernet (FCoE) is a technology used for transporting Fiber Channel (FC) frames over Ethernet, which is standardized at the Technical Committee for Fiber Channel (T11) of the International Committee for Information Technology Standards (INCITS). The Fibre Channel over Ethernet (FCoE) allows Fibre Channel (FC) frames to be transmitted and received over an Ethernet network. The transported FC frames are used based on an FC architecture for storage networking purposes. The FC-BB-6 working group of the T11 Fibre Channel standards committee is working to develop a distributed switch model with associated protocols. The model may be applied to both FCoE switches (FCFs) or just standard FC switches. During a fabric login (FLOGI) from a device, communication is required between all the components (e.g., FCoE data forwarder (FDF) and controlling Fibre Channel Forwarder (cFCF) of the distributed switch). The current state of the art protocols allow an end device (e.g., an initiating device) to begin communication with other devices (e.g., target device) in the fabric before the communication of required zoning information to other components of the distributed switch is complete. The current state of the art $|_{[1]}|$iprotocols $|_{[2]}|$fail to synchronize all the FDF's in a distributed switch before allowing an end device (e.g., and Enode) to start communicating with other end devices through all of the FDF's. As result, efficiency and productivity may be reduced.

In contrast, and to address the inefficiencies and performance issues previously described, the illustrated embodiments provide mechanisms for fibre channel forwarder fabric login sequence in a fibre channel switch environment, where a Fibre Channel Forwarder (cFCF) is separated from a Fibre Channel over Ethernet (FCoE) data forwarder (FDF). The mechanisms, by way of example only, at a Fibre Channel Login (FLOGI) to a target device from an initiator device, hold a address acceptance notification from reaching the initiator device until each of the zoning distributions have been considered to have been completed.

The mechanisms seek to provide a solution for synchronizing of zoning distribution in a distributed FC and/or FCF switch. The mechanisms, by way of example only, provide for completion of zoning distribution protocols between components of a distributed switch before completing the fabric login process and allowing an end device to communicate with other devices in the fabric. By ensuring that zoning distribution is complete before allowing a device to begin communication to other end devices on the fabric, unnecessary communication failures and associated error recovery may be minimized and/or avoided.

Turning now to FIG. 1, exemplary architecture 10 of data storage systems (e.g., virtual tape systems) in a computing environment to accomplish the purposes of the present invention for the fibre channel forwarder fabric login sequence is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. As one skilled in the art will appreciate, the mechanisms of the data storage systems illustrated in FIG. 1 serve to accomplish the purposes of the present invention for the fibre channel forwarder fabric login sequence and may work in conjunction with and be implemented with the fibre channel adapter, as illustrated in FIG. 2, and/or with other components and mechanisms as described below.

Figure 2:
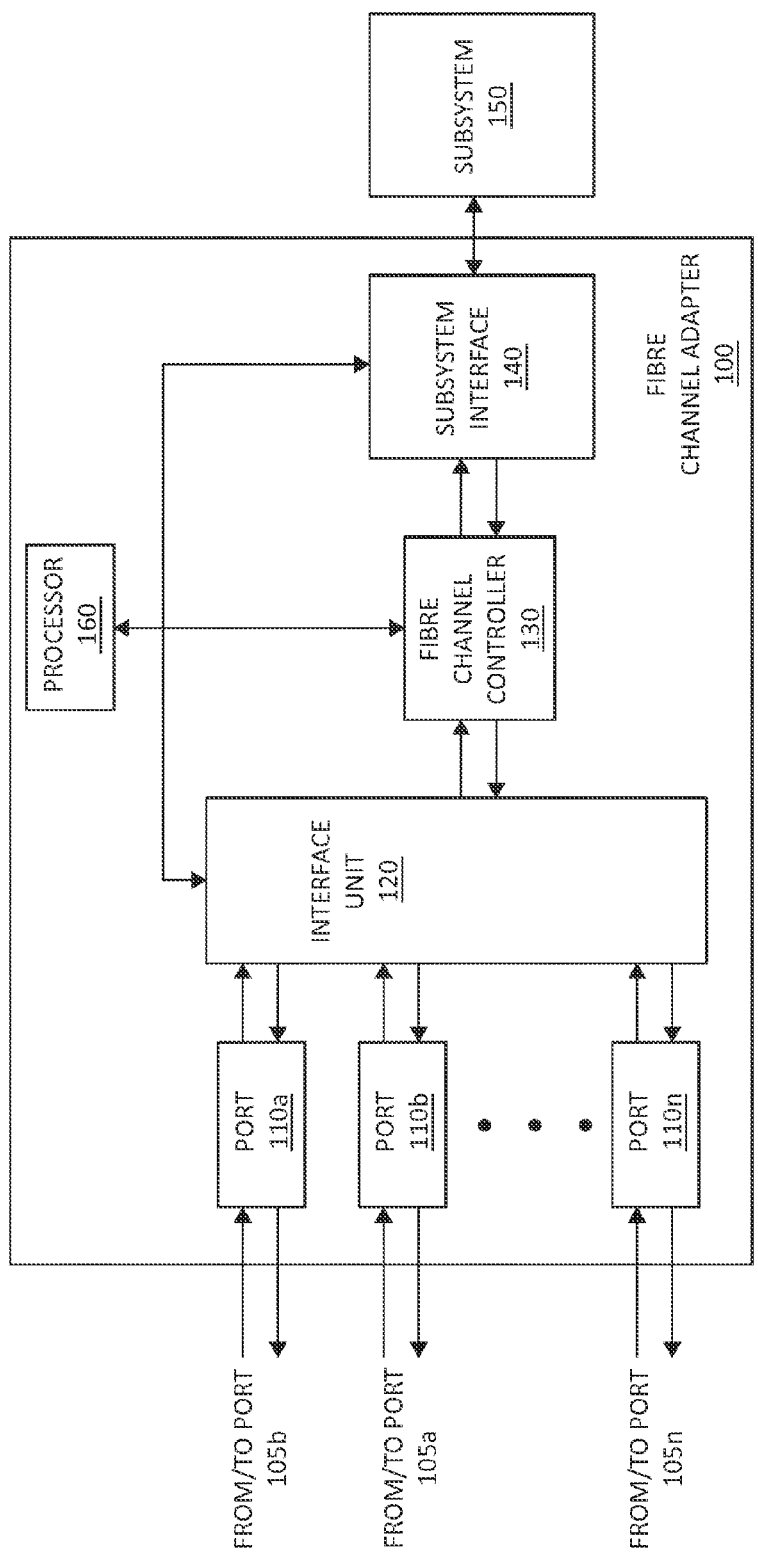
FIG. 2 is a schematic block diagram illustrating one embodiment of a fibre channel adapter in which aspects of the present invention may be realized.

FIG. 2 is a schematic block diagram of an exemplary fibre channel adapter 100 is illustrated. A first fibre channel port 105a (not shown) is electrically connected to an associated port 110a of adapter 100. Similarly, ports 105b and 105n are associated with ports 110b and 110n, respectively. As one skilled in the art will appreciate, port 105a may be integrated into or associated with a connected device, such as an additional storage component. The connected device may have an additional fibre channel adapter 100 in which the ports 105a-n are integrated.

Fibre channel adapter 100 may be integrated into a fibre channel extender device previously described, where a port 110a may accept a first fibre channel cable and port 110b may accept a second fibre channel cable to connect the first and second cables together. Each of the ports 110a-n can provide access to bi-directional input/output (I/O) data links. The data links allow various components of a computer system to be interconnected as previously described. For example, the data links may provide a mechanism by which host requests for access to the resources of a SAN can be received and passed on to associated storage devices and communication between storage routers can take place.

To facilitate such communication, adapter may contain such components as an interface unit 120, a fibre channel controller (this may also be referred to as a Fibre Channel Forwarder) 130, a processor 160, and a subsystem interface 140. Such components as a fibre channel controller 130 and/or a processor 160 provide hardware mechanisms by which to execute various aspects of the instant description and claimed subject matter. For example, the standard speed negotiation algorithm may be executed by processor 160 operational on adapter 100. Further, aspects of the presently described protocol and claimed subject matter, such as hard setting a link speed may be executed on the fibre channel controller 130, processor 160, or elsewhere. A subsystem interface 140 connects the adapter 100 to a subsystem 150, such as a particular storage environment of a storage area network. In one embodiment, various aspects of the instant description may take place coincidentally on an additional adapter 100.

As previously mentioned, during a fabric login (FLOGI) from a device, communication is required between all the components (e.g., communication between the FCoE data forwarder (FDF) and the controlling Fibre Channel Forwarder (cFCF) of the distributed switch). The currently proposed protocols allows an end device (e.g., an initiating device) to begin communication with other devices (e.g., target device) in the fabric before the communication of required zoning information to other components of the distributed switch is complete. However, the current state of the art protocols fail to synchronize all the FDF's in a distributed switch before you allow an Ethernet (FCoE) node (ENode) (e.g, a host bus adapter (HBA)) to start communicating with other end devices through the FDF's. In order to solve these inefficiencies of the current state of the art, several factors should be considered. During a Fibre Channel Login (FLOGI) process, the zoning distribution should be before VN_Ports can send the N_Port Login (PLOGI) to other VN_Ports (e.g., when the FLOGI is complete). The FDF's should be configured to handle and respond to multiple received FLOGI's/FDISC in parallel. Thus, the FDF has to initiate multiple VN_Port Reachability Notification's (VNRN) to the cFCF's in parallel. A bad/slow FDF should not cause the FLOGI's to good FDF's to fail. Moreover, under normal circumstances, a FLOGI should complete in a reasonable amount of time (e.g., some small number of milliseconds). Thus, efficiency and production is increased by the ability to incorporate these factors into the mechanisms of the present invention, as described below.

In one embodiment, by way of example only, the mechanisms of the illustrated embodiments provide for a distributed FCF fabric login sequence in a fibre channel switch environment, where a Fibre Channel Forwarder (cFCF) is separated from a Fibre Channel over Ethernet (FCoE) data forwarder (FDF). The mechanisms, by way of example only, may perform a Fibre Channel Login (FLOGI) to a target device from an initiator device. A node address acceptance notification is held from reaching the initiator device until each of the zoning distributions have been considered to have been completed.

Figure 3:
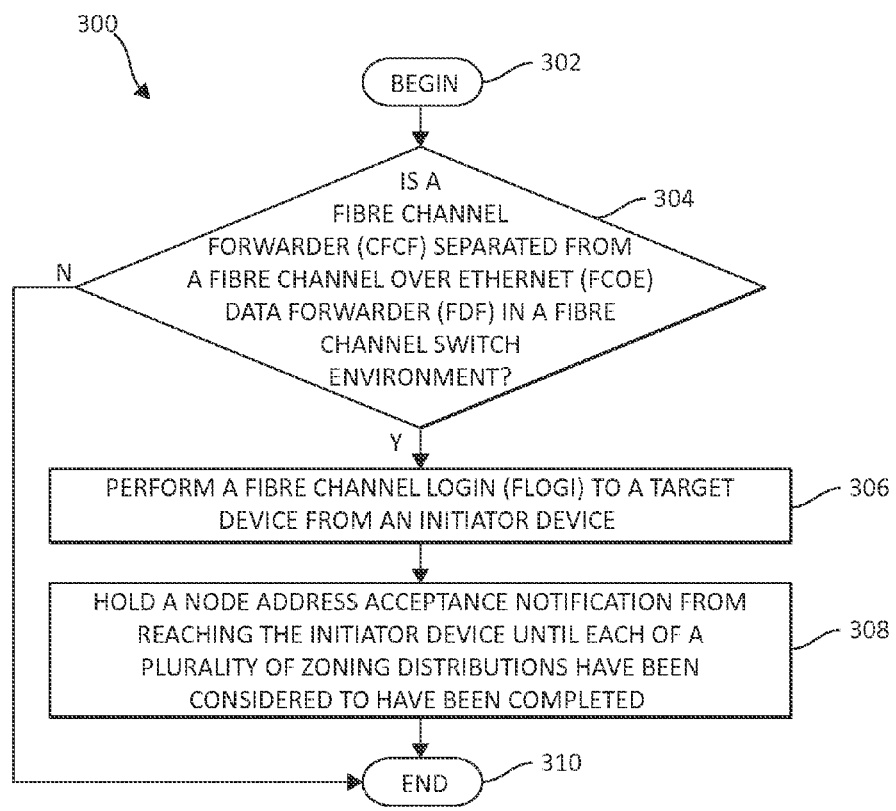
FIG. 3 is a flowchart illustrating an exemplary method 300 for a distributed FCF fabric login sequence in a fibre channel switch environment according to the mechanisms of the illustrated embodiments.

FIG. 3 is a flowchart illustrating an exemplary method 300 for a distributed FCF fabric login sequence in a fibre channel switch environment according to the mechanisms of the illustrated embodiments. The method 300 begins (step 302) by determining if a Fibre Channel Forwarder (cFCF) is separated from a Fibre Channel over Ethernet (FCoE) data forwarder (FDF) in a fibre channel switch environment (step 304). The method 300 performs a Fibre Channel Login (FLOGI) to a target device from an initiator device (step 306). A node address acceptance notification is held from reaching the initiator device until each of a plurality of zoning distributions have been considered to have been completed (step 306). The method ends (step 308).

Figure 4A:
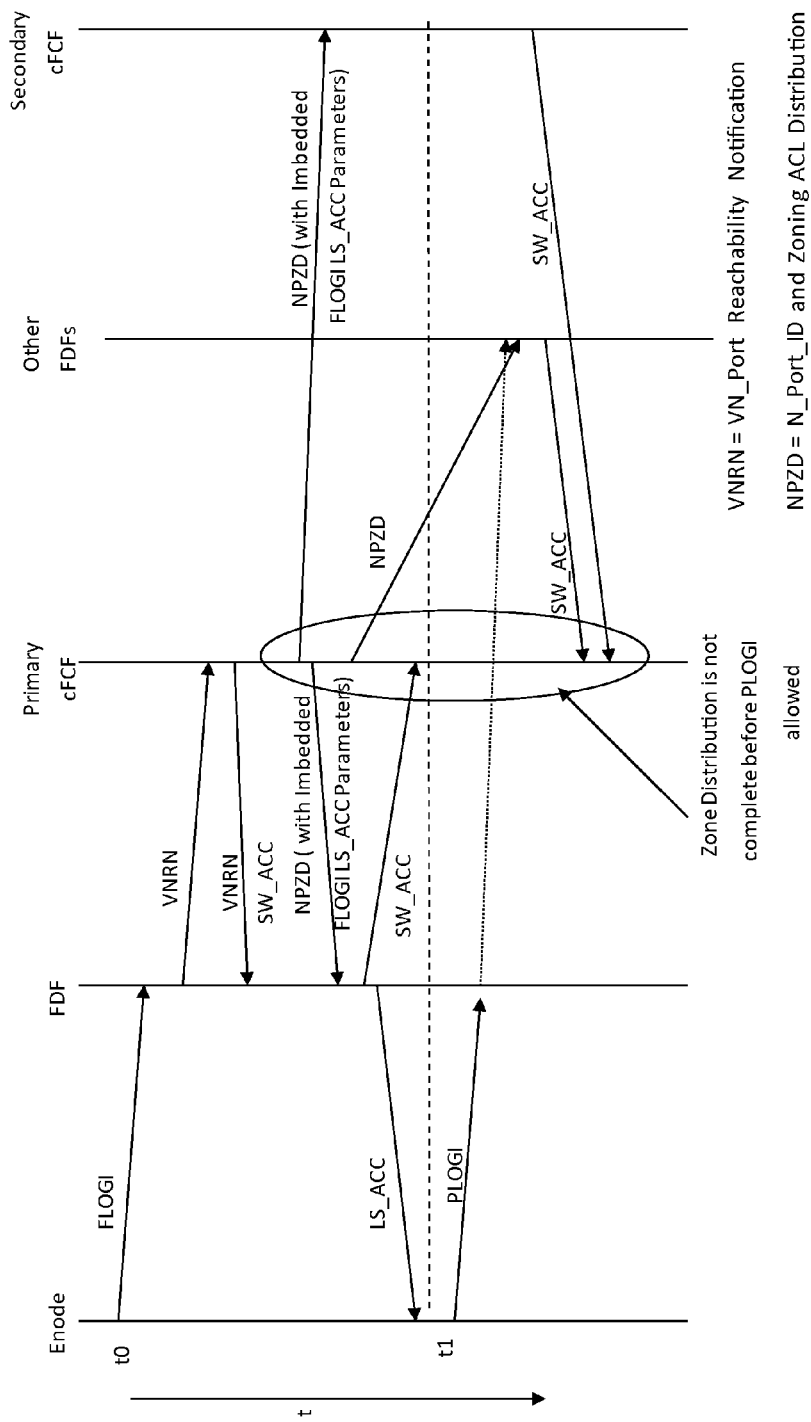
FIG. 4A is an exemplary block diagram showing a FLOGI process of a distributed switch model and associated protocols for the current state of the art.
Figure 4B:
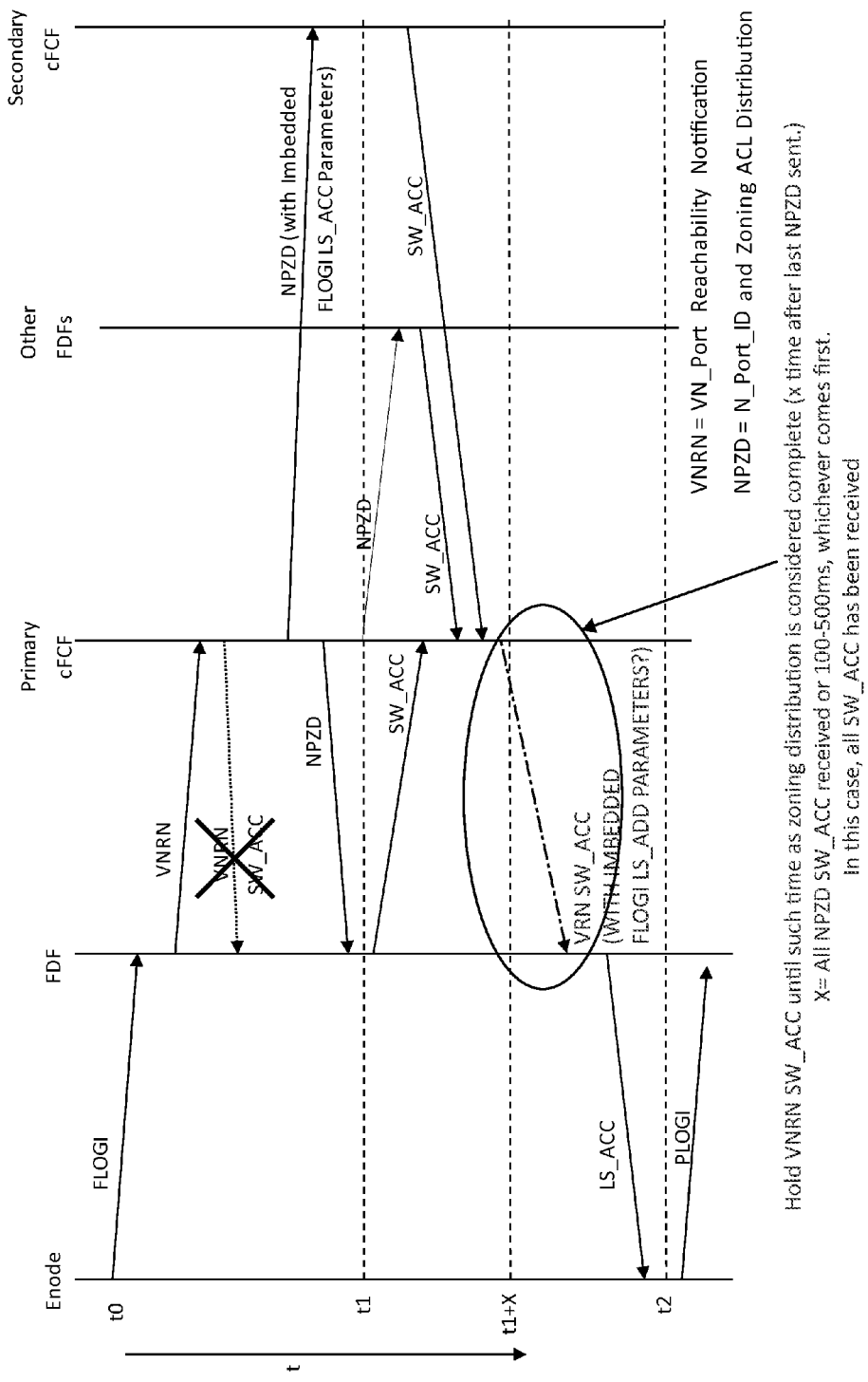
FIG. 4B illustrates an exemplary block diagram showing the distributed FCF fabric login sequence with all SW_ACC received.
Figure 4C:
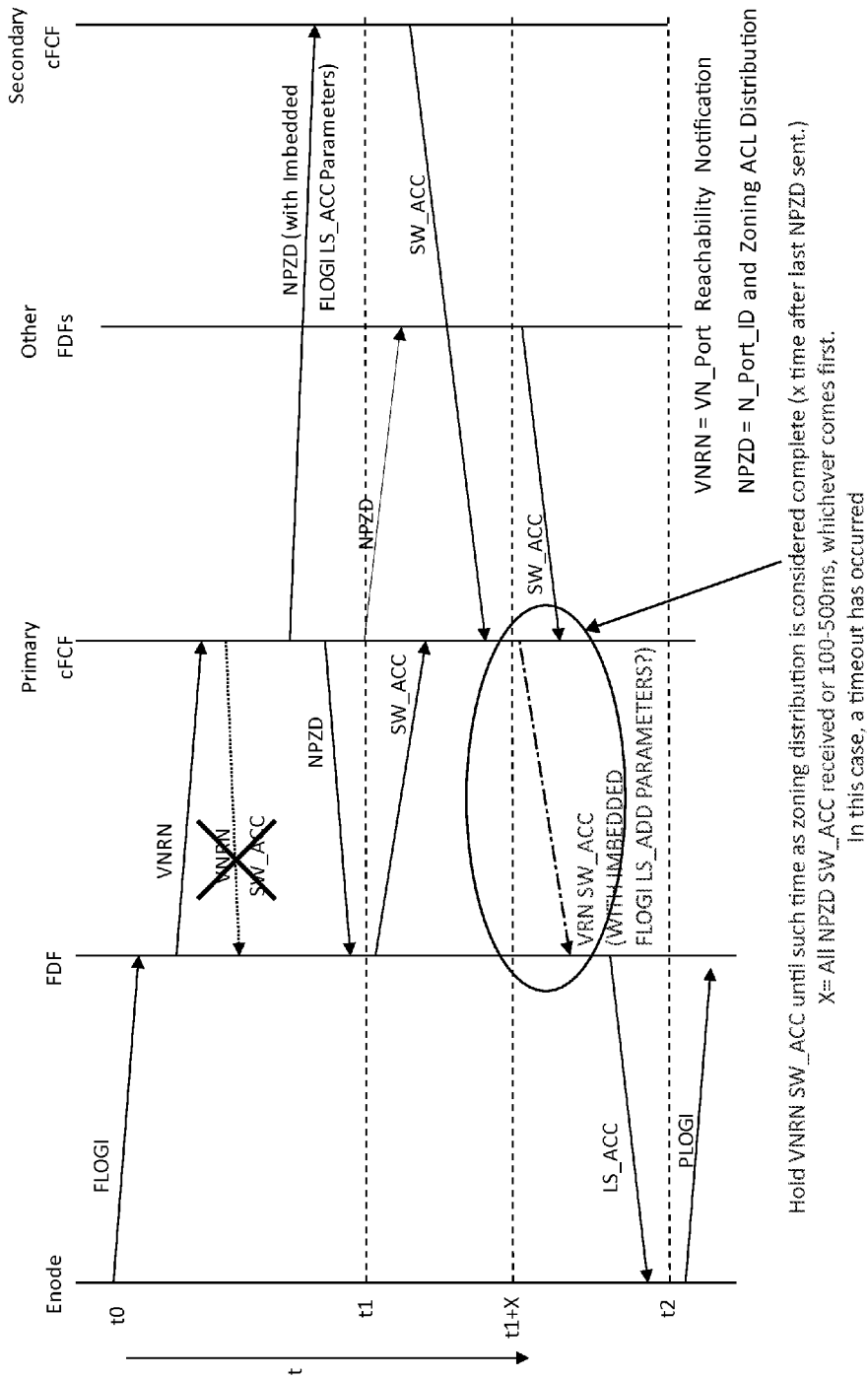
FIG. 4C illustrates an exemplary block diagram showing the distributed FCF fabric login sequence with a time out.

As will be described below, FIG. 4A-4C are illustrative embodiments of the FLOGI process. FIG. 4A is an exemplary block diagram showing a FLOGI process of a distributed switch model and associated protocols for the current state of the art. In FIGS. 4B and 4C, the mechanisms of the present invention are illustrated to provide a solution for synchronizing of zoning distribution in a distributed FC and/or FCF switch. Turning to FIG. 4A, FIG. 4A is an exemplary block diagram showing a FLOGI process of the distributed switch model and associated protocol. As illustrated in FIG. 4A-4C, during a fabric login (FLOGI) from a device, communication is required between all the components (e.g., FCoE data forwarder (FDF) and the controlling Fibre Channel Forwarder (cFCF) of the distributed switch. The FDF's may be connected to the end devices and the cFCF contains the fibre channel services (e.g., the name server, the fabric server, etc.) that allow for the functioning of the FCoE. As illustrated in FIGS. 4A, 4B, and 4C, each line with an arrow indicates a communication from one entity to another entity with the name of the type of communication above the line (e.g., from the Enode a FLOGI is sent to the FDF). Each Enode is connected to the FDFs, and upon a FLOGI from an Enode to the connected FDF, the Enode thinks the FDF is the FCF. In FIG. 4A-4C, the first vertical line is the Enode component (e.g., a host bus adapter) and the four vertical lines to the right are the distributed FCF's broken down into components (e.g., the FDF, the primary cFCF, other FDF's, and Secondary cFCF). Each of the individual FDF's may contain multiple ports (e.g., 10 Enodes may be connected to an FDF). Since, the FDF does not have the knowledge to assign fibre channel identifier (FCID) addresses, the FDF will communicate with the cFCF and notify the cFCF that an entity (e.g., Enode) is attempting a FLOGI because only the cFCF has the knowledge to assign the FCID address. This communication from the FDF to the cFCF is referred to as a VN_Port reachability Notification (VNRN). The cFCF understands and interprets this communication from the FDF as an allocation request for a FCID address and allocates a FCID address from a fibre channel domain, (the fibre channel domain may be referred to as a virtual domain since a channel may be split up amongst the various components), which is the address space controlled by the distributed switch, and accepts the request. Next, a N_Port_ID and Zoning ACL distribution (NPZD) message is sent from the primary cFCF (but a secondary cFCF may be available for use in case of high availability or for fail over) to all of the FDF's to update and inform the FDF's that a new identification (ID) will be allocated for all of the associated N-Ports that the ID is permitted to communicate with as part of the zoning distribution.

However, as illustrated in FIG. 4A, the zoning distributions have failed to complete and the FLOGI is accepted prior to the zoning distributions (e.g., the FDF receives the NPZD after the VNRN was sent from the FDF and the node address acceptance notification is sent prematurely). For example, as illustrated in FIG. 4A, the Enode performs a FLOGI to the FDF. The VNRN communication message is sent to the cFCF. The node address acceptance notification (VNRN SW_ACC) is accepted and sent back to the FDF from the cFCF. The Enode is now free to communicate with the network. As depicted in FIG. 4A, some NPZD's are accepted and sent back to the FDF from the primary cFCF and are embedded with the FLOGI link services accept (LS_ACC) parameters while other NPZD's are sent from the primary cFCF to other FDF's, thus indicating the zoning distributions have yet to complete prior to the VNRN SW_ACC being sent back to the FDF. By sending the VNRN SW_ACC back to the FDF, this allows the FDF to send the LS_ACC to the Enode and the FLOGI is accepted. In FIG. 4A, the LS_ACC to the FLOGI is triggered by the receipt of NPZD from cFCF. Thus, since the PLOGI is typically one of the first communication coming from the Enode to login to the device in which it desires to communicate, if the PLOGI sent by the Enode is forwarded by the FDF to the other FDF (as illustrated by the dotted line in FIG. 4A) it may reach the other FDF's prior to the other FDF receiving the NPZD. If such an event occurs, the other FDF is uncertain how to treat the PLOGI and is unable to deliver the frame thereby requiring an error recovery operation. The delay of the NPZD reaching the other FDF prior to the PLOGI reaching the other FDF may result in a variety of reasons (e.g., network delays, slow FDF's or slow path to the FDF delays the NPZD completion). Thus, the zoning distribution is not complete before the PLOGI is allowed. It should be noted that if there are multiple VNRNs (due to multiple FLOGIs), there will be multiple NPZDs that need to trigger LS_ACC. The FDF must use the N_Port name to find the associated FLOGI. As a result, there needs to be some sort of timeout for each VNRN to wait for the corresponding NPZD (to avoid a FLOGI timeout).

To address the inefficiencies previously described in FIG. 4A, FIG. 4B illustrates an exemplary block diagram showing the distributed FCF fabric login sequence with all SW_ACC received. In one embodiment, the mechanisms control when the link services accept (LS_ACC) is sent back to the Enode by completing the zoning distribution. As illustrated in FIG. 4B, the Enode sends the FLOGI to the FDF. The FDF communicates with the cFCF by sending the VNRN, as described previously in FIG. 4A. However, rather than the node address acceptance notification (VNRN SW_ACC) accept being sent back to the FDF from the cFCF, the node address acceptance notification is held and/or delayed until after NPZD zoning distributions (e.g., NPZD, switch accept (SW_ACC)) are sent from the cFCF and a waiting period is introduced to allow for the completion of the zoning distributions. For example, as illustrated in FIG. 4B, the left most horizontal line displays time values of t0, t1, t1+x, and t2. The time period t1 may be the time all of the NPZD's are sent and t1+x may be the time when the switch accepts (SW_ACC) of the VNRN (e.g, the VNRN SW_ACC) are sent from the cFCF to the FDF then allowing the FDF to complete the FLOGI with the LS_ACC. The time period represented by t1+x may be the time required for holding the VNRN SW_ACC until such time as zoning distributions are considered to be complete (x time after the last NPZD is sent). The "x" value may represent the time period required for all the accepts of the NPZD's (NPZD SW_ACC) to be received or may represent a time period after a period (e.g., 100 to 500 milliseconds (ms)), or which ever one comes first. The 100 to 500 milliseconds may be altered base upon the needs of the user and may be adjusted accordingly to accomplish the purposes of the present invention. For example, in a small network, the 100 ms may be instituted and in a larger network 500 ms may be implemented. One of the reasons for the time out period is to address faulty network issues. For example, if there is a faulty network, a bad FDF, a bad link, or some other cause that results in the NPZD to be slow, delayed and/or prevents the NPZD and/or the NPZD SW_ACC from reaching its destination, then one of the FDFs may prevent the Enode connected to the distributed switch to FLOGI to the network, since the VNRN would never reach the FDF and the LS_ACC would never reach the Enode thereby resulting in a time out.

Thus, mechanisms of the present invention provide a time out to allow a reasonable time to pass for the zoning distributions to complete. The timeout value may be based on the size of the distributed FCF. In one embodiment, a minimum time value, such as 100 ms, may be used to at least ensure transmission is complete and a maximum time value, e.g., 500 ms, may be set to prevent long FLOGI times. As an option to better ensure completion of distribution before end device communication, upon timeout, the mechanisms may send a busy response to FLOGI (e.g, send the busy signal at least one time to the FLOGI) and allow the end device (e.g., an initiating device) to initiate retry. In one embodiment, the mechanisms may either continue to wait for completion of the previously started distribution or retry the FLOGI process from the beginning in order to achieve higher efficiency. This decision may be based on a timeout waiting for a retry of the FLOGI. The mechanisms may use a VNRN internal link service (ILS) timer for timing the process to avoid using a separate timer for waiting for the VNRN.

By delaying the node address acceptance notification (VNRN SW_ACC) the NPZD zoning distributions are allowed to complete. As illustrated in FIG. 4B, the cFCF sends a NPZD to the FDF, a NPZD (with the FLOGI LS_ACC parameters imbedded in the NPZD) to the secondary cFCF, and a NPZD to the other FDF's prior to issuing the VNRN SW_ACC. Moreover, at some time after t1+x, the cFCF issues the VNRN SW_ACC and also imbeds the FLOGI LS_ACC parameters in the VNRN SW_ACC. The FLOGI LS_ACC parameters are imbedded in with the VNRN SW_ACC because the VNRN SW_ACC payload naturally caries the FLOGI ACC parameters and the assigned N_Port ID that were requested by VNRN. The VNRN exchange context is used to correlate the VNRN SW_ACC to the FLOGI LS_ACC link services accept (LS_ACC). When the cFCF sends the delayed (or held) VNRN SW_ACC to the FDF, the FDF then communicates back to the Enode the LS_ACC. The Enode then issues the PLOGI. As illustrated in FIG. 4B, all of the SW_ACC have been received prior to issuing the VNRN SW_ACC.

Turning to FIG. 4C, FIG. 4C illustrates an exemplary block diagram showing the distributed FCF fabric login sequence with a time out. FIG. 4C is similar to FIG. 4B, but illustrates the other FDF's and the secondary cFCF sending the SW_ACC at an alternative period of time as compared to FIG. 4B. Thus, FIG. 4C, illustrates that a time out occurs, while FIG. 4B illustrates that all the SW_ACC have been received. In FIG. 4C, the VNRN SW_ACC is then sent during the t1+x time period. All other features and depictions as described in FIG. 4B are similarly displayed in FIG. 4C.

Figure 5:
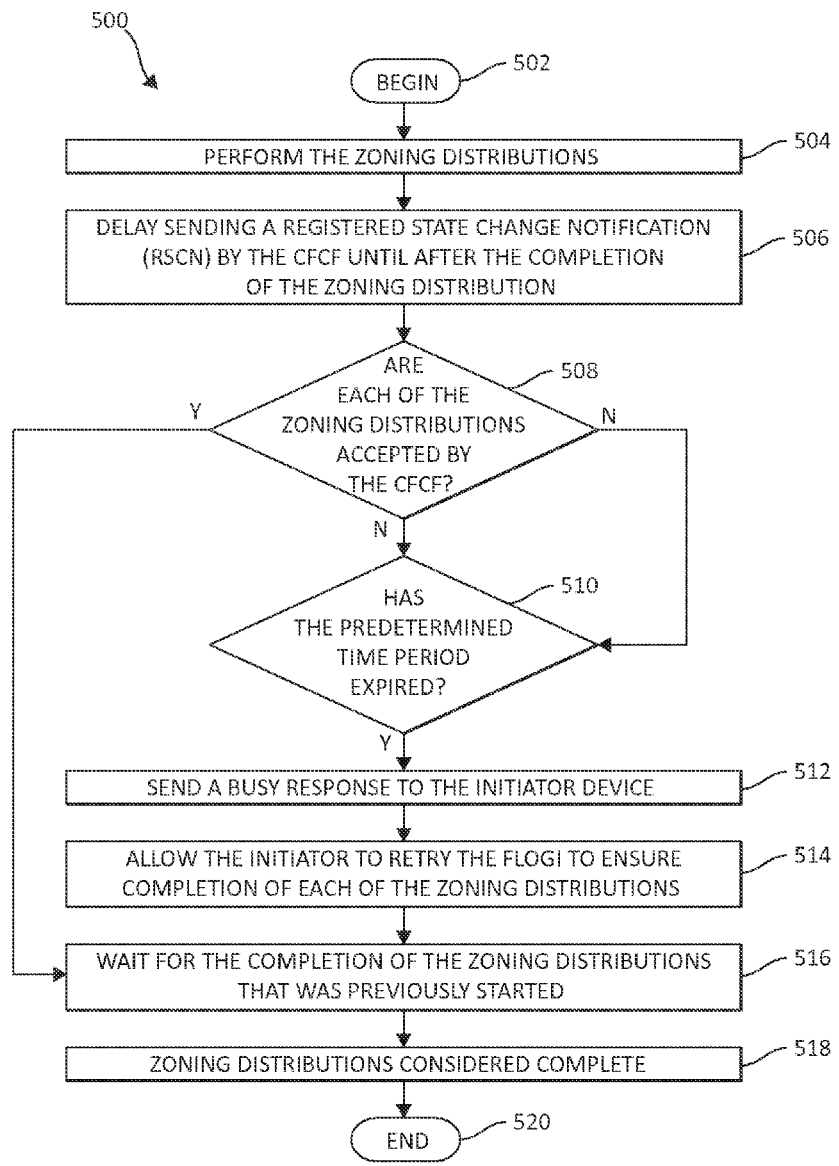
FIG. 5 is a flowchart illustrating an exemplary method 500 for performing the distributed FCF fabric login sequence.

As mentioned above (e.g., FIG. 4B and FIG. 4B), provide for completion of zoning distribution protocols between components of a distributed switch before completing the fabric login process and allowing an end device to communicate with other devices in the fabric. By ensuring that zoning distribution is complete before allowing a device to begin communication to other end devices on the fabric, unnecessary communication failures and associated error recovery can be minimized or avoided. With the foregoing in mind, FIG. 5 is a flowchart illustrating an exemplary method 500 for performing the distributed FCF fabric login sequence. The method 500 begins (step 502) by performing the zoning distributions (step 504). The method delays sending a registered state change notification (RSCN) by the cFCF until after the completion of the zoning distribution (step 506). The method determines if each of the zoning distributions are accepted by the cFCF (step 508). If yes, the method 500 will consider the zoning distributions as completed (step 518). If no, the method 500 will determine if the predetermined time period expired (step 510). If no, the method 500 will repeat and go back and check if the zoning distributions are all accepted (step 508). If the predetermined time period has expired, the method may choose to send a busy response to the initiator device (step 512). The busy signal is sent only one time, but may be sent more than one time if needed to accomplish the purposes of the present invention. The initiator device is allowed to retry the FLOGI to ensure completion of each of the zoning distributions (step 514). The method 500 may wait for the completion of the most recent previously started zoning distributions (step 516). The method 500 considers the zoning distributions as complete (step 518). The method 500 ends (520).

Figure 6:
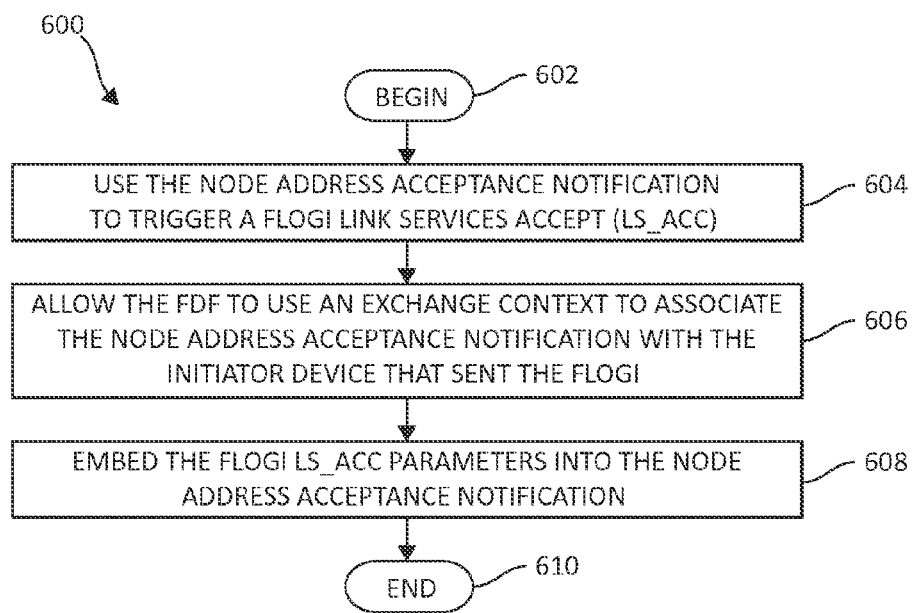
FIG. 6 is a flowchart illustrating an exemplary method 600 for using an exchange context to match multiple VNRN requests and responses.

In conjunction with the zoning distributions and acceptance, FIG. 6 is a flowchart illustrating an exemplary method 600 for using an exchange context to match multiple VNRN requests and responses. Because multiple FLOGI's may occur simultaneously coming from multiple ports thereby producing multiple VNRN's, it is essential to associate the node address acceptance notification with the initiator device that sent the FLOGI. The exchange context allows the method 600 to avoid matching up FC port names. The exchange context allows for a one-to-one correspondence between the FLOGI and the VNRN. In short, by using the VNRN SW_ACC to trigger the FLOGI LS_ACC allows the FDF to use exchange context to match multiple VNRN requests and responses and correlate them to the multiple FLOGI requests. The method 600 begins (step 602) by using the node address acceptance notification to trigger a FLOGI link services accept (LS_ACC) (step 604). The FDF is allowed to use an exchange context to associate the node address acceptance notification with the initiator device that sent the FLOGI (step 606) The FLOGI LS_ACC parameters are embedded into the node address acceptance notification (step 608). The method 600 ends (step 610).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. In a fibre channel switch environment including a Fibre Channel Forwarder (cFCF) separated from a Fibre Channel over Ethernet (FCoE) data forwarder (FDF), a system, comprising:
   at least one processor device, operable in the fibre channel switch environment, wherein the at least one processor device:
   at a Fibre Channel Login (FLOGI) to a target device from an initiator device, holds a node address acceptance notification from reaching the initiator device until each of a plurality of zoning distributions have been considered to have been completed.

2. The system of claim 1, further wherein the plurality of zoning distributions are considered to have been completed if at least one of:
   each of the plurality of zoning distributions are accepted by the cFCF, and
   a predetermined time period has expired.

3. The system of claim 2, further wherein the predetermined time period is at least one of:
   based upon the size of a fibre channel forwarder (FCF), and
   set to a minimum and maximum time.

4. The system of claim 2, further wherein the at least one processor device, if the predetermined time period has expired, performs at least one of:
   sending sends a busy response to the initiator device, and
   allowing allows the initiator device to retry the FLOGI to ensure completion of each of the plurality of zoning distributions.

5. The system of claim 4, further wherein the at least one processor device, pursuant to the retry for the FLOGI, continues to wait for the completion of a previously started one of the plurality of zoning distributions.

6. The system of claim 1, further wherein the at least one processor device performs at least one of:
   using the node address acceptance notification to trigger a FLOGI link services accept (LS_ACC) to allow the FDF to use an exchange context to associate the node address acceptance notification with the initiator device that sent the FLOGI, and
   embedding the FLOGI LS_ACC parameters into the node address acceptance notification.

7. The system of claim 1, further wherein the at least one processor device delays a sending of a registered state change notification (RSCN) by the cFCF until after the completion of the plurality of zoning distributions.

8. In a fibre channel switch environment including a Fibre Channel Forwarder (cFCF) separated from a Fibre Channel over Ethernet (FCoE) data forwarder (FDF), a computer program product for performing a fibre channel forwarder fabric login sequence by a processor device, the computer program product comprising a non-transitory computer-readable storage medium having computer-readable program code portions stored therein, the computer-readable program code portions comprising:
   at a Fibre Channel Login (FLOGI) to a target device from an initiator device, a first executable portion that holds a node address acceptance notification from reaching the initiator device until each of a plurality of zoning distributions have been considered to have been completed.

9. The computer program product of claim 8, further including a second executable portion that considers the plurality of zoning distributions to have been completed if at least one of:
   each of the plurality of zoning distributions are accepted by the cFCF, and
   a predetermined time period has expired.

10. The computer program product of claim 9, further including a third executable portion that performs at least one of:
    basing the predetermined time period upon the size of a fibre channel forwarder (FCF), and
    setting the predetermined time period to a minimum and maximum time.

11. The computer program product of claim 9, further including a third executable portion that, if the predetermined time period has expired, performs at least one of:
    sending a busy response to the initiator device,
    allowing the initiator device to retry the FLOGI to ensure completion of each of the plurality of zoning distributions, and
    wherein pursuant to the retry for the FLOGI, continuing to wait for the completion of a previously started one of the plurality of zoning distributions.

12. The computer program product of claim 8, further including a second executable portion that performs at least one of:
  using the node address acceptance notification to trigger a FLOGI link services accept (LS_ACC) to allow the FDF to use an exchange context to associate the node address acceptance notification with the initiator device that sent the FLOGI, and
  embedding the FLOGI LS_ACC parameters into the node address acceptance notification.

13. The computer program product of claim 8, further including a second executable portion that delays a sending of a registered state change notification (RSCN) by the cFCF until after the completion of the plurality of zoning distributions.

* * * * *